United States Patent
Brey et al.

(10) Patent No.: US 7,837,423 B2
(45) Date of Patent: Nov. 23, 2010

(54) SLUDGE DIVERTER FOR USE WITH SILO SLIDING FRAME

(75) Inventors: Charles G. Brey, Stillwater, MN (US); Franz Tillman, Lagrangeville, NY (US)

(73) Assignee: Schwing Bioset, Incorporated, Somerset, WI (US)

( * ) Notice: Subject to any disclaimer, the term of this patent is extended or adjusted under 35 U.S.C. 154(b) by 1178 days.

(21) Appl. No.: 11/130,453

(22) Filed: May 16, 2005

(65) Prior Publication Data

US 2006/0263180 A1    Nov. 23, 2006

(51) Int. Cl.
    *B65G 65/44*    (2006.01)
(52) U.S. Cl. .................. 414/311; 414/306; 222/200
(58) Field of Classification Search .............. 414/326, 414/306, 311, 321; 222/200
    See application file for complete search history.

(56) References Cited

U.S. PATENT DOCUMENTS

| | | | |
|---|---|---|---|
| 2,726,792 A * | 12/1955 | Seymour | .................. 222/199 |
| 3,763,868 A * | 10/1973 | Khan | .................. 460/59 |
| 3,985,244 A | 10/1976 | Gessler et al. | |
| 4,043,488 A * | 8/1977 | Halvorsen et al. | ........... 222/233 |
| 4,531,876 A | 7/1985 | Gessler | |
| 4,731,179 A * | 3/1988 | De Baere | .................. 210/251 |
| 4,810,159 A * | 3/1989 | Stegmuller | .................. 414/498 |
| 5,360,141 A * | 11/1994 | Scatizzi | .................. 222/55 |
| 5,540,533 A | 7/1996 | Eskelinen | |
| 6,076,276 A * | 6/2000 | McKenzie et al. | ........... 34/166 |
| 6,129,215 A | 10/2000 | Brauch et al. | |
| 6,190,105 B1 * | 2/2001 | Zey | .................. 414/306 |
| 6,451,163 B2 | 9/2002 | Prough et al. | |

* cited by examiner

*Primary Examiner*—Saúl J Rodriguez
*Assistant Examiner*—Jonathan D Snelting
(74) *Attorney, Agent, or Firm*—Kinney & Lange, P.A.

(57) ABSTRACT

A silo for storing viscous material such as sludge, the silo comprising a floor and a perimeter wall connected to the floor, is disclosed. The silo further comprises a moveable frame adjacent to the floor wherein the frame defines an area less than the area of the floor, and an opening in the floor. A crosspiece having opposite ends mounted to generally opposing portions of the perimeter wall is provided within the silo adjacent to the moveable frame. The crosspiece contains a surface facing the floor and is positioned adjacent to the frame. The crosspiece further comprises one or more diverter portions connected to the crosspiece which extend from the floor facing surface of the crosspiece towards the floor.

8 Claims, 4 Drawing Sheets

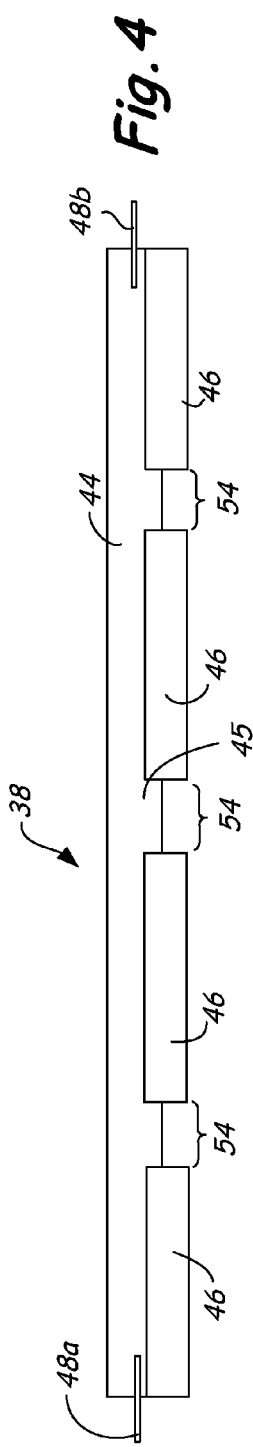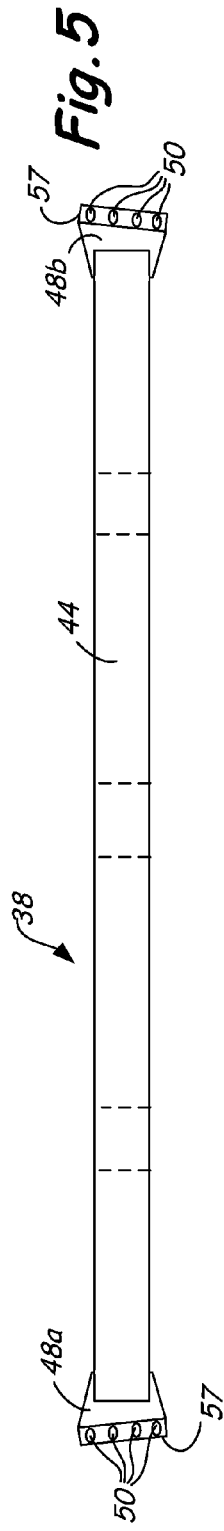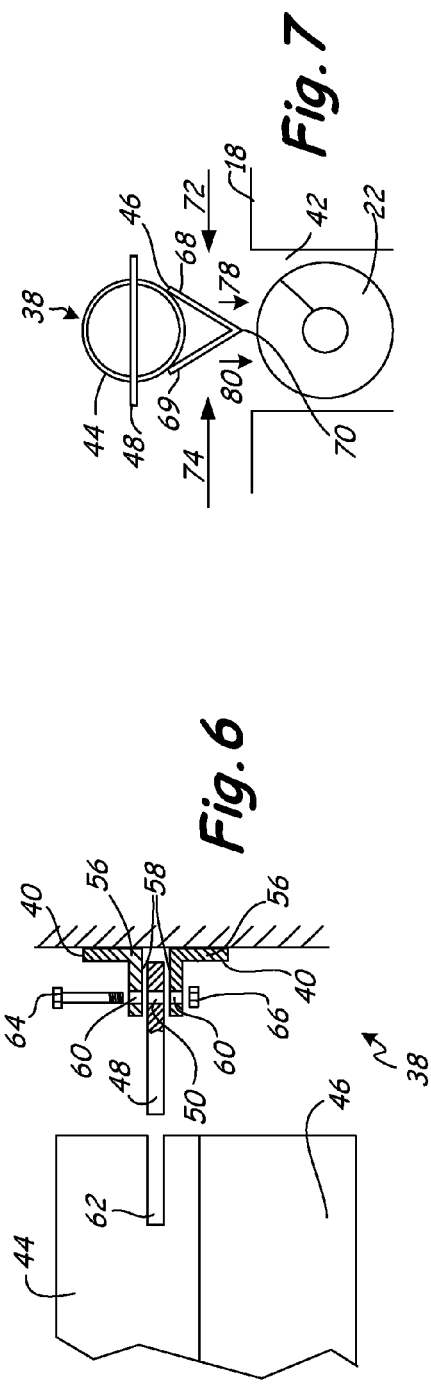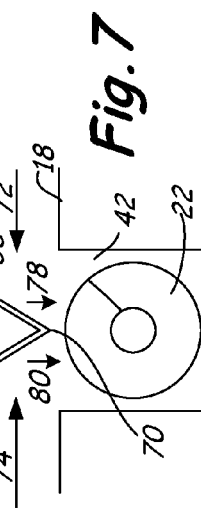

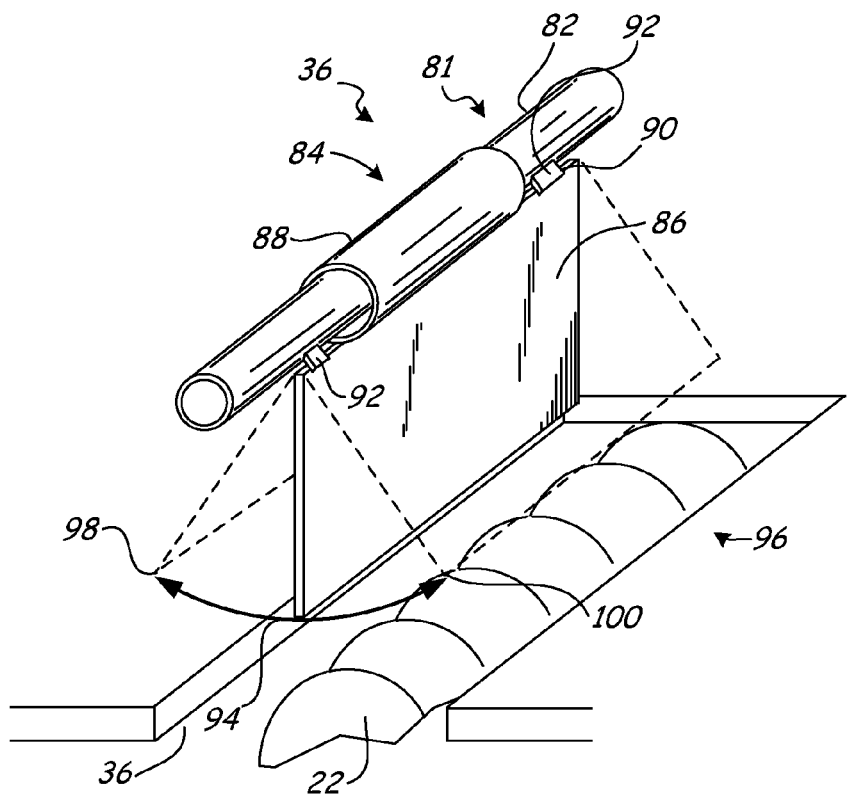
Fig. 8
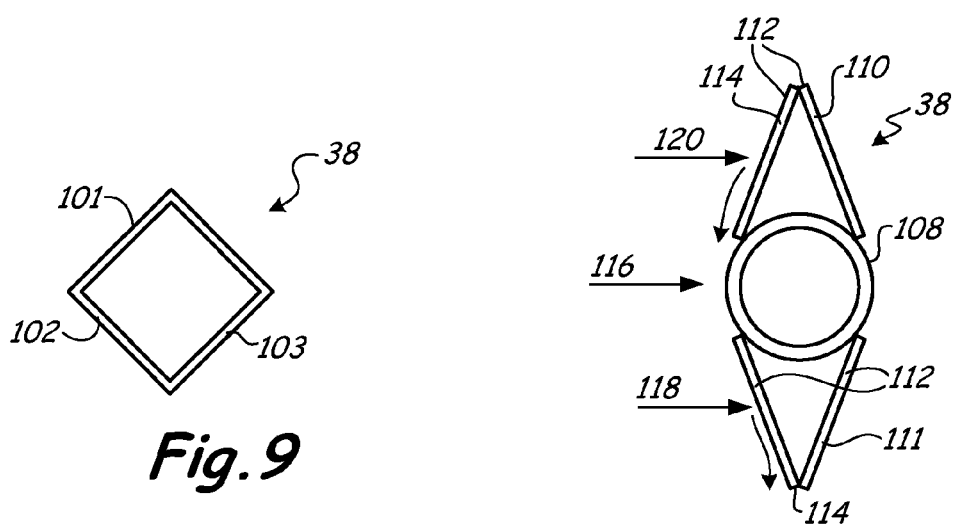
Fig. 9
Fig. 10

SLUDGE DIVERTER FOR USE WITH SILO SLIDING FRAME

BACKGROUND OF THE INVENTION

The present invention relates to storage systems for high viscosity materials. More particularly, the present invention relates to a mechanism for diverting high viscosity material into an opening for unloading from the storage system.

Highly viscous materials, such as sludge from waste water treatment, are often stored in silos. The highly viscous materials typically have no free-flow characteristics and need an assist to be moved from one point to another. Various systems have been used for the movement storage and handling of such highly viscous materials.

One common storage facility for sludge and other highly viscous materials is a silo that contains a sliding frame system near the silo floor. A sliding frame silo consists of one or more hydraulic cylinders which reciprocate a frame across the floor to move material into a conveyor located in a channel below the silo floor. FIG. 1 is a perspective view of a typical cylindrical storage silo 12 for holding viscous material, with an outer wall 14 broken away to expose a hydraulically activated slide frame 16 near floor 18 of silo 12. FIG. 2 is atop view of the inside of the storage silo 12 containing slide frame 16. Material stored within silo 12 is discharged by reciprocating slide frame 16 across floor 18 to assist transporting the material to outlet 20 via one or more conveyors 22 positioned in a floor channel beneath the slide frame 16.

Materials stored in silo 12 which are of a high viscosity tend to resist natural gravitational flow. In order to facilitate the movement of such material out of silo 12, a slide frame 16 is used. The slide frame 16 of silo 12 is a simple machine consisting of either one or two hydraulic cylinders driving slide frame 16 in a reciprocating motion across the silo floor 18. Slide frame 16 is configured with a perimeter frame portion 24 connected by central truss 26, support members 28, and cross supports 30 leaving open areas 34 between the structures. As shown, the perimeter frame portion 24 is generally elliptical in shape comprising a mirrored pair of symmetrical chords, however square, round, and other geometries are common depending on the geometry of the floor of the silo 12. The frame portion 24 of slide frame 16 comprises an area less than the area of the floor 18 allowing slide frame 16 to be moved across floor 18 of silo 12 by a hydraulic plunger connected to central truss 26 in the direction of arrows 32. In doing so, perimeter frame portion 24 is intended to agitate the high viscosity material adjacent floor 18. The agitated material then falls through the open areas 34 and through a floor opening 42 into either the conveyor channels or a gate mechanism and is transported out of silo 12. It is desirable to keep conveyor 22 full or a steady flow of material to the gate mechanisms thereby allowing material metering.

The above described silo 12 design provides for a low cost method to store a large volume of material while awaiting final disposal. The sliding frame 16 located in the bottom of the silo 12 allows for metered unloading of stored sludge. Sliding frame or push floor technology within silos is useful for bulk handling processes, including biosolids (biologically derived cake material with greater than 12% solids, or other slurries and sludge with up to eighty percent solids content), coal dust, and wood chips, etc.

Often, however, the stored material bridges to form a cohesive mass, and thus moves as a single mass upon slide frame 16. Bridging of the viscous material occurs when the material viscosity resists flow from normal forces such as gravity. If material bridging occurs, the sliding frame movement may not be adequate to direct the material to the discharge opening. The present invention addresses the problem of material bridging for removal of highly viscous materials from a sliding frame silo storage system.

BRIEF SUMMARY OF THE INVENTION

A silo for storing viscous material, such as sludge, comprising a floor and a perimeter wall connected to the floor is disclosed. The silo contains a moveable frame adjacent to the floor, and an opening in the floor. A crosspiece having opposite ends mounted to generally opposing portions of the perimeter wall is provided within the silo. The crosspiece comprises one or more diverter plates connected to the crosspiece which extend from a floor facing surface of the crosspiece towards the floor. As the moveable frame moves across the silo floor, the diverter plates direct movement of material stored within the silo to the opening in the floor to facilitate removal of the material from the silo.

BRIEF DESCRIPTION OF THE DRAWINGS

FIG. 4 is a side view of one embodiment of a crosspiece of the diverter mechanism of FIG. 3.

FIG. 5 is a top view of one embodiment of the crosspiece of FIG. 4.

FIG. 6 is a side partially sectioned view of a mounting mechanism for the crosspiece.

FIG. 7 is an end view of the crosspiece positioned above the silo floor.

FIG. 8 is an enlarged partial perspective view of a first alternative embodiment of the crosspiece within the storage silo.

FIG. 9 is an end profile of a second alternative embodiment of a crosspiece.

FIG. 10 is an end profile of a third alternative embodiment of a crosspiece.

DETAILED DESCRIPTION

Figure 1:
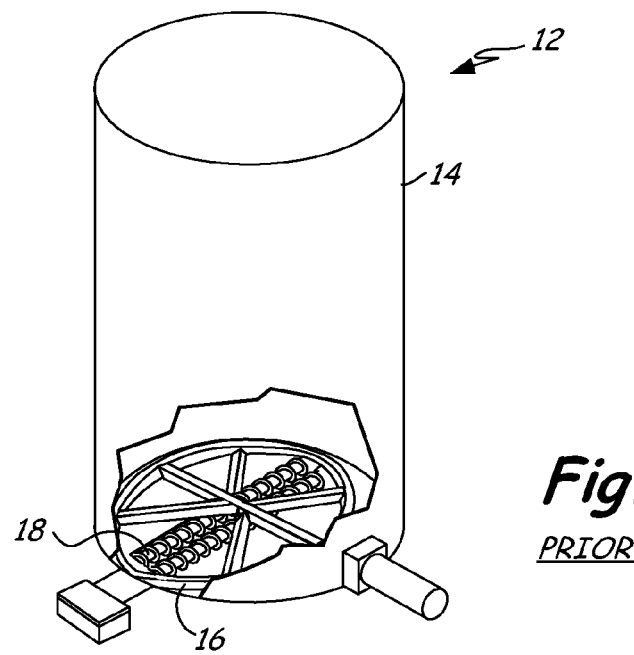
FIG. 1 is a perspective view of a storage silo containing a slide frame.
Figure 2:
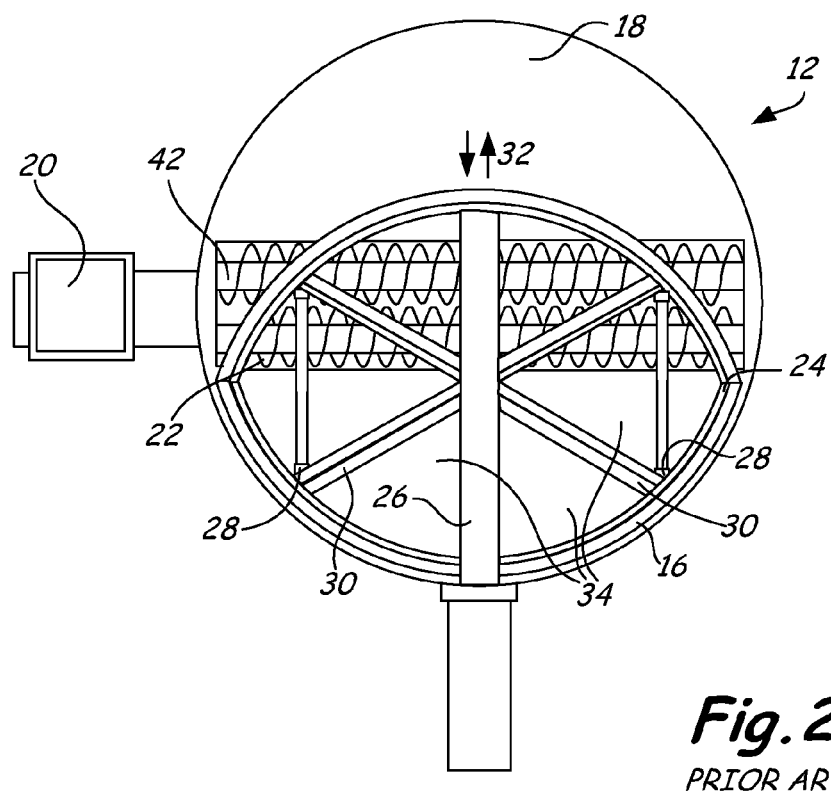
FIG. 2 is a top view of the inside of the storage silo of FIG. 1
Figure 3:
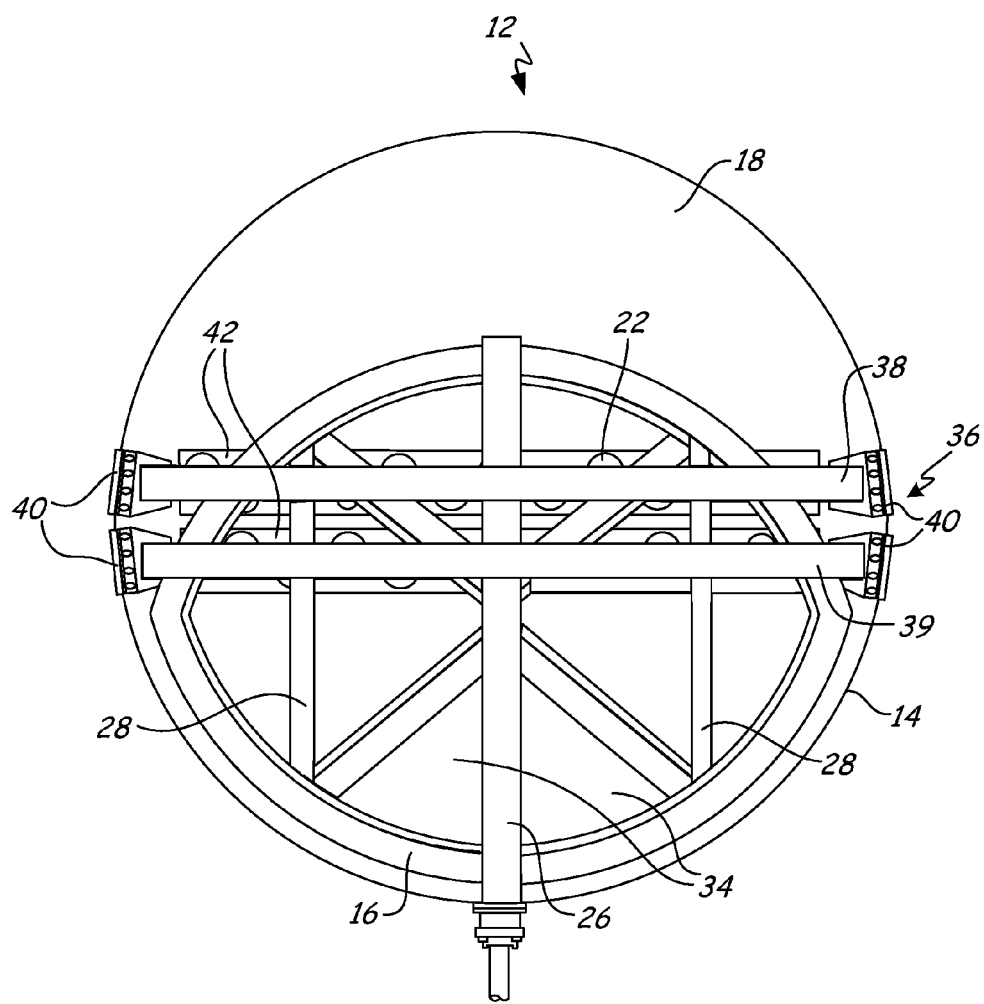
FIG. 3 is a top view of the inside of the storage silo of FIG. 2 with a diverting mechanism of the present invention.

FIG. 3 is a top view of silo 12 with a diverter mechanism 36 of the present invention for improved discharge of viscous material from silo 12. Diverter mechanism 36 comprises crosspieces 38, 39 the opposing ends of which are mounted to inner wall surface 14 of silo 12 by mounting brackets 40. Crosspieces 38, 39 are positioned to be above slide frame 16 and over openings 42, respectively, of floor 18. In the embodiment shown, crosspieces 38, 39 are generally centered on and parallel to openings 42. Crosspieces 38, 39 serve as shear surfaces that engage and cleave viscous material carried by frame 16 as a cohesive mass, and direct loosened material through openings 42 so that the material may be transported by conveyors 22 or gate mechanisms for direct loading and metering of the loosened material onto a transport vehicle.

FIG. 4 is a side view of one embodiment of crosspiece 38. FIG. 5 is a top view of the same embodiment of crosspiece 38. Crosspiece 38 generally comprises tube 44 deflector plates 46 and mounting plates 48a, 48b. Tube 44 is a metal tube. For example, tube 44 may be a commercially available six inch schedule eighty steel pipe.

Attached to each opposite ends of tube 44 are mounting plates 48. Each mounting plate 48 is constructed from a sheet of material such as quarter inch steel plate or bar stock. Mounting plates 48 are fabricated to contain one or a plurality of holes 50 (as illustrated in FIG. 5) to receive fasteners 64, 66 (shown in FIG. 6) for attaching to mounting brackets 40 (shown in FIG. 3). In one embodiment, mounting plates 48 are fabricated to contain an angle or an arced end 57 corresponding to the shape of wall 14 of silo 12. Mounting plates 48 are secured to tube 44 by welding or similar permanent connections.

Also attached to a floor-facing surface 45 of tube 44 are deflector portions 46 (illustrated in FIG. 4). Deflector portions 46 assist in deflecting the flow of material, as the material is moved by slide frame 16, to the opening 42. Deflector portions 46 are positioned along tube 44 to create spaces 54, which accommodate the central truss 26 and the support members 28 (see FIG. 3) of slide frame 16 as frame 16 moves across floor 18. Deflector portions 46 extend below tube 44 to the open area 34 (see FIG. 3) in the lattice of slide frame 16.

FIG. 6 is a side view of a mounting mechanism for crosspiece 38. As shown in FIG. 6, mounting plate 48 is secured between a pair of L-shaped mounting brackets 40, each comprising a vertical portion 56 and leg portion 58, and which are secured to wall 14 of silo 12, such as by welding. Legs 58 of brackets 40 are spaced to receive plate 48. Holes 60 are provided in legs 58 to correspond to holes 50 in plate 48.

As further shown in FIG. 6, in one embodiment the tube 44 is provided with a slot 62 for receiving the mounting plate 48 prior to the welding of mounting plate 48 to tube 44. Crosspiece 38 is then positioned so that mounting plate 48 is inserted between mounting brackets 40. Holes 60 are aligned with holes 50 in mounting plate 48 and fasteners 64 (e.g. a UNC hardened bolt) are inserted through all corresponding holes 50 and 60 and secured (e.g. with nuts 66). In an alternative embodiment, tube 44 is attached directly to wall 14 of silo 12 by welding.

FIG. 7 is an end view of crosspiece 38. In one embodiment, deflector portions 46 are comprised of a v-shaped metal stock having two angled surfaces 68, 69 which meet at apex 70. All deflector portions 46 (see FIG. 4) are secured to tube 44 to create substantially co-planar surfaces 68, 69 among the deflector portions 46, and so that surfaces 68, 69 are at an angle to floor 18. As shown in FIG. 7, crosspiece 38 is in a fixed position above and generally parallel to the opening 42 in floor 18. In the embodiment illustrated, opening 42 is in communication with conveyor 22, which is a screw auger. In alternative embodiments, the conveyor 22 can also be a chain or belt conveyor, bucket conveyor, or similar apparatus for transporting the material out of silo 12.

As slide frame 16 (not illustrated) is actuated across floor 18 as represented by arrow 72, the stored high viscosity material in the silo 12 strikes angled surface 68 of deflector portions 46 and is dislodged and directed into opening 42. Similarly, as the actuating mechanism is retracted and slide frame 16 moves in the direction of arrow 74, material that has been loosened will be forced into opening 42 as the slide frame 16 drags the material until the material contacts angled surface 69 of deflector portions 46. Material is deflected into opening 42 as shown by flow arrows 78 and 80.

FIG. 8 is a view of an end portion of another embodiment of a crosspiece 81 of the diverter mechanism 36. In this embodiment, a tube 82 comprising a metal pipe is fixed to wall 14 of silo 12 in the manner previously described relative to tube 44. Deflector 84 comprises a metal plate 86 fixed along one side edge to a metal sleeve 88 that is sized to slide over tube 82. Metal plate 86 is secured to mounting sleeve 88 by welding an edge 90 perpendicular to the surface of mounting sleeve 88. Mounting sleeve 88 is a structure similar to tube 82, and contains an inner diameter nominally larger than the outer diameter of tube 82. This allows mounting sleeve 88 to have rotational movement about tube 82.

Mounting sleeve 88 is positioned between stops 92 on tube 82. The center of edge 90 of the metal plate 86 is attached to the metal sleeve 88 leaving portions of the metal plate 86 to extend past the ends of the metal sleeve 88. The over length portions of metal plate 86 contact stops 92 which prevent full rotational movement of the deflector 84. In the embodiment illustrated, stops 92 are portions of metal bar stock welded perpendicular to the outer surface of the tube 82, and are generally parallel to the metal plate 86 as the metal plate 86 reaches maximum range points 98, 100. Stops 92 are adjacent to the ends of mounting sleeve 88. A gap is left between the ends of mounting sleeve 88 and stop 92 to allow free rotational movement while preventing lateral movement of the deflector 84 on the tube 82. Stops 92 extend radially outward from the tube 82 such that the metal plate 86 will be impeded from full rotational movement about an axis centered through the tube 82. Although not visible in this view, a second set of stops identical in structure are located on the inverse side of the tube 82. This second set of stops are positioned to create a mirror image of the visible stops from the plane created by metal plate 86.

The rotational movement of deflector 84 is represented by the phantom lines for range of swing 94. In operation, slide frame 16 (not illustrated in this view) moving in the direction of arrow 96 force the stored material in silo 12 to contact the deflector 84, which will in turn rotate about tube 82 to maximum range point 98. The rotation of the deflector 84 is stopped when metal plate 86 strikes stops 92 (not visible in this view) located on tube 82. At this position, the deflector 84 is aligned above the edge of opening 42 to direct the material into opening 42, which is then removed by conveyor 22. Similarly, when slide frame 16 is moving in the opposite direction, the deflector 84 will be engaged by material coming from the opposite direction and forced to rotate about the tube counter-clockwise to the maximum range point of 100 wherein the metal plate 86 will engage stops 92. The deflector 84 will cease rotational movement and metal plate 86 will direct stored material into opening 42. Although only one deflector is shown in FIG. 6, several deflectors may be mounted to tube 82 corresponding to open areas 34 in the lattice of slide frame 16, (shown in FIG. 3). The deflectors 84 and thus do not interfere with the slide frame 16 movements.

FIG. 9 illustrates an end view of a second alternate embodiment of crosspiece 38. In this embodiment, crosspiece 38 is a square tube 101 mounted within silo 12 such that angled surfaces 102, 103 are at a forty-five degree angle relative to floor 18. The cross piece 38 is mounted adjacent the slide frame 16 which allows free movement of the frame 16 below the tube 101, but shears bridged material within silo 12.

Similarly, FIG. 10 is an end view of a third alternative embodiment of crosspiece 38. Crosspiece 38 comprises tube 108 with deflector portions 110, 111. Deflector portions 110, 111 comprise angled plates 112, which are attached to tube 108 to intersect at vertices 114. In this embodiment, deflector portions 110 are mounted on opposite sides of tube 108. Angled plates 112 are constructed from sheet material, while tube 108 is a metal pipe. Angled plates 112 may be spaced to leave spaces to accommodate the central truss 26 and support members 28 of slide frame 16. In such an embodiment, angled plates 112 extend below tube 108 to the open areas 34 of slide frame 16 (see FIG. 3).

This embodiment aids in directing flow above the crosspiece 38 downward, which can then be further directed by the lower deflector portion 111. When slide frame 16 moves in the direction of arrow 116, material at the bottom of the bins is directed into opening 42 as represented by arrow 118. The movement of the slide frame 16 also affects stored material adjacent to the top of the crosspiece 38. The material will be directed as represented by arrow 120, the angled plates 112 of deflector portion 110 will contact the material and direct its movement downward to remove the material from silo 12.

Alternatively, this embodiment may be mounted about a support member (not illustrated) that is of a smaller diameter than the inner diameter of the tube 108. This allows for rotational movement of the tube 108 and deflector portions 110, 111 as the slide frame 16 reciprocates within silo 12. The support member together with the tube 108 and deflector portions 110, 111 comprise diverter mechanism 36. The support member contains stops 92 similar to those as illustrated in FIG. 6. In such an embodiment, the length of deflector portions 110, 111 and tube 108 is nominally smaller than the distance between adjacent stops 92 mounted on the support member. This embodiment allows a full rotation for the tube 108, but stops 92 act to position deflector portions 110, 111 and tube 108 laterally upon the support member.

To better facilitate material discharge and/or metering of stored material, the diverter mechanisms 36 as previously described aid in controlling and directing the movement of the stored material to the opening 42. The crosspiece 38 shears the bridged material as the frame 16 moves within silo 12. The angle surfaces of crosspiece 36 also direct the loosened material into opening 42 (see FIG. 7). The diverter mechanism 36 comprises one or more crosspieces 38 mounted within the silo 12.

A method of storing viscous material, such as sludge, utilizes the above disclosed structure. First, viscous material is deposited into a storage facility containing a moveable frame adjacent to the floor. Next, the viscous material is accumulated in the storage facility and stored for a period of time. After storage is complete, the stored material is removed from the silo. Because of the high viscosity of the material, the material tends to resist flow. The moveable frame is operated to dislodge bridging viscous material and moves the viscous material within the storage facility. A crosspiece with deflector portion is provided to shear and direct the outflow of the viscous material to an opening within the floor of the storage facility. The crosspiece is located adjacent the moveable frame to facilitate a shearing of the viscous material to create a flowable material. The material is removed from the silo by either a conveyor in a channel below the floor opening or a gate mechanism in communication with the opening.

Although the present invention has been described with reference to preferred embodiments, workers skilled in the art will recognize that changes may be made in form and detail without departing from the spirit and scope of the invention.

The invention claimed is:

1. A silo for storing viscous material such as sludge, the silo comprising a floor and a perimeter wall connected to the floor, wherein the silo further comprises:
    a moveable frame adjacent to the floor, the frame comprising a top surface and a bottom surface that moves along the floor, wherein the frame defining an area less then the area of the floor;
    an opening in the floor; and
    an elongate crosspiece, positioned to traverse the opening, having opposite ends mounted to generally opposing portions of the perimeter wall, the crosspiece having a surface facing the floor, positioned above the frame, and one or more diverter portions connected to the crosspiece and extending from the floor facing surface below the top surface of the frame and towards the opening in the floor.

2. The silo of claim 1 wherein the crosspiece comprises:
    an elongate metal tube which is generally parallel to the opening in the floor.

3. The silo of claim 1 wherein one or more diverter portions comprise angle iron mounted to the floor facing surface of the crosspiece.

4. The silo of claim 1 further comprises a plurality of crosspieces, each having opposite ends mounted to generally opposing portions of the perimeter wall, the crosspiece having a surface facing the floor, positioned adjacent to the frame, and one or more diverter portions connected to the crosspiece and extending from the floor facing surface towards the floor.

5. In a silo for storage of sludge material, the silo comprising a floor, a perimeter wall, one or more discharge openings in the floor, and a moveable frame parallel to the floor, a diverter for mounting in the silo, the diverter comprising:
    an elongate crosspiece having opposite ends mounted to generally opposing portions of the perimeter wall, wherein the crosspiece is at least partially above the moveable frame and is positioned to traverse the opening;
    extensions attached to the crosspiece, the extensions protruding below at least a portion of the frame towards the floor of the silo; and
    wherein the crosspiece and extensions do not interfere with the movement of the moveable frame.

6. The diverter of claim 5 wherein the crosspiece comprises:
    an elongate metal tube which is generally proximate to the one or more discharge openings in the floor.

7. The diverter of claim 5 wherein the extensions comprise plates mounted to a floor facing surface of the crosspiece at an angle to the silo floor.

8. The diverter of claim 5 further comprising a plurality of crosspieces mounted within the silo.

* * * * *

UNITED STATES PATENT AND TRADEMARK OFFICE
CERTIFICATE OF CORRECTION

| | | |
|---|---|---|
| PATENT NO. | : 7,837,423 B2 | Page 1 of 1 |
| APPLICATION NO. | : 11/130453 | |
| DATED | : November 23, 2010 | |
| INVENTOR(S) | : Charles G. Brey and Franz Tillman | |

It is certified that error appears in the above-identified patent and that said Letters Patent is hereby corrected as shown below:

Col. 1, Line 24
  Delete "atop"
  Insert --a top--

Signed and Sealed this
Eighteenth Day of October, 2011

David J. Kappos
*Director of the United States Patent and Trademark Office*